United States Patent [19]
Spaenig et al.

[11] 3,843,676
[45] Oct. 22, 1974

[54] PRODUCTION OF SUBSTITUTED IMIDAZOLES

[75] Inventors: Hermann Spaenig, Limburgerhof; Toni Dockner, Meckenheim; Anton Frank, Ludwigshafen, all of Germany

[73] Assignee: Badische Anilin- & Soda-Fabrik Aktiengesellschaft, Ludwigshafen/Rhine, Germany

[22] Filed: Feb. 8, 1972

[21] Appl. No.: 224,618

[30] Foreign Application Priority Data
Feb. 13, 1971 Germany............................ 2106877

[52] U.S. Cl.............. 260/309, 260/309.2, 260/999
[51] Int. Cl............................................. C07d 49/36
[58] Field of Search......................... 260/309, 309.2

[56] References Cited
UNITED STATES PATENTS
3,177,223  4/1965  Erner................................... 260/309
3,652,581  3/1972  Spaenig et al. ..................... 260/309

FOREIGN PATENTS OR APPLICATIONS
1,324,155  3/1963  France................................ 260/577

OTHER PUBLICATIONS

Derrien et al. I, Chem. Abst., Vol. 58, column 12,383, (1962).

Derrien et al. II, Bull. Soc. Chim., France 1962, pages 2164–2173.

Suter et al., Chem. Abst., Vol. 59, column 12,704, (1963).

Popov et al., Chem. Abst., Vol. 59, columns 3346–3347, (1963).

*Primary Examiner*—Natalie Trousof
*Attorney, Agent, or Firm*—Johnston, Keil, Thompson & Shurtleff

[57] ABSTRACT

The production of imidazoles bearing a substituent on a nitrogen atom by reaction of an imidazole with an aliphatic alcohol or ether in the presence of an oxide and/or phosphate of a metal of Group 2, 3 or 4 of the Periodic Table and additionally in the presence of a phosphoric acid and/or an ester of a phosphoric acid. The products are intermediates for the production of dyes, textile auxiliaries and insecticides.

13 Claims, No Drawings

PRODUCTION OF SUBSTITUTED IMADAZOLES

This invention relates to a process for the production of imidazoles which bear a substituent on a nitrogen atom by reaction of an imidazole with an aliphatic alcohol or ether in the presence of an oxide and/or phosphate of a metal of Group 2, 3 or 4 of the Periodic Table and additionally in the presence of phosphoric acid and/or a phosphoric acid ester.

It is known from Hofmann, "Imidazole and its derivatives," (1953), page 49, that imidazoles can be alkylated on the substituted nitrogen atom with an alkyl halide or sulfate. It is convenient to start from a metal salt of the appropriate imidazole and to exclude water in order to improve the yield of end product. German Pat. No. 1,213,413 describes alkylation of the nitrogen atom by means of oxalic esters. All these methods start from alkylating agents which are fairly troublesome to prepare and give unsatisfactory yields of imidazoles alkylated on a nitrogen atom. The purity of the end products is impaired by the formation of quaternary imidazolium compounds.

U.S. Pat. No. 3,652,581 issued Mar. 28, 1972 relates to a process for the production of a substituted imidazole of the general formula:

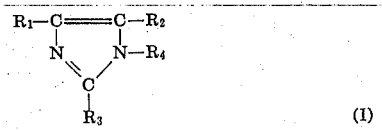

(I)

in which $R^1$, $R^2$ and $R^3$ may be identical or different and each is hydrogen or an aliphatic, araliphatic, cycloaliphatic or aromatic radical and $R^4$ is an aliphatic radical, $R^1$ and $R^2$ may moreover together be members of a condensed aromatic ring, by reaction of an imidazole of the general formula:

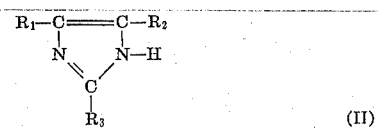

(II)

in which $R^1$, $R^2$ and $R^3$ have the above meanings with a compound of the general formula:

(III)

in which $R^4$ has the meanings given above and $R^5$ is hydrogen or an aliphatic radical at a temperature of from 200° to 450° C in the presence of an oxide and/or phosphate of a metal of group 2, 3 or 4 of the Periodic Table.

The object of the present invention is to provide a new process that gives substituted imidazoles in a simpler manner and in a better yield and purity and has the advantage that the period of operation of appropriate plant, particularly commercial plant, is substantially prolonged and the catalyst has a longer life.

We have found that the process of U.S. Pat. No. 3,652,181 can be modified by carrying out the reaction in the presence of one of the said catalysts and additionally in the presence of a phosphoric acid and/or an ester of a phosphoric acid.

When 2-methylimidazole and dimethyl ether are used the reaction may be represented by the following equation:

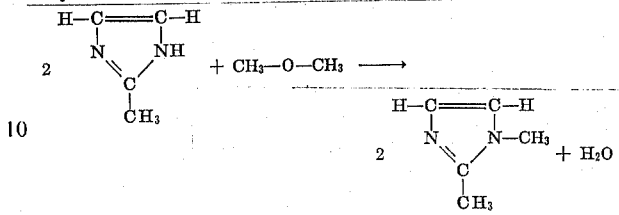

As compared with prior art methods the process of the invention gives a large number of imidazoles bearing a substituent on a nitrogen atom in a simpler manner and in better yields and purity.

As compared with the process of U.S. Pat. No. 3,652,581 the process of the invention has the advantage that the period of operation of appropriate plant, particularly commercial plant, is much longer, i.e., the catalyst has a longer life. In fact the catalyst used in the process according to the said application can be regenerated, for example by decomposition of the organic impurities formed on the catalyst in a current of air at 400° to 500° C and the generated catalyst may be used again for producing end product (I) in good yield. A catalyst thus regenerated has however a fairly short life.

The catalyst used in the process of the invention has a longer life by comparison and gives the end product in a consistently high yield even when the plant is operated for more than 3,000 hours. After the catalyst of this invention has been regenerated, its life is longer; for example the end product can be prepared in a high yield for more than 1,000 hours. The formation of cracked products on the catalyst, which lessens or inhibits the active centers of the catalyst, is substantially decreased. The economy and reliability of the process for the production of imidazoles (I) is significantly improved in the said manner. This advantageous result is surprising having regard to the prior art.

Imidazoles of the general formula (II) which bear a substitutable hydrogen atom on one nitrogen atom are used as starting materials. Preferred starting materials (II) and consequently preferred end products (I) are those in whose formulae $R^1$, $R^2$ and $R^3$ are identical or different and each is hydrogen, alkyl, aralkyl, cycloalkyl or aryl preferably of up to 12 carbon atoms and $R^1$ and $R^2$ may also be members of a condensed aromatic six-membered ring.

For example the following substituted imidazoles may be used as starting material (II) apart from imidazole itself: 2-methylimidazole, 2-cyclohexylimidazole, 2-benzylimidazole, 2-phenylimidazole and corresponding imidazoles bearing the substituents in the 4-position or 5-position; 2,4-dimethylimidazole, 2,4-dicyclohexylimidazole, 2,4-dibenzylimidazole, 2,4-diphenylimidazole and corresponding imidazoles bearing two or three substituents in the 2-position, 4-position and/or 5-position; 2-phenyl-4-methyl-5-ethylimidazole, 2-propyl-4-benzyl-5-phenylimidazole, benzimidazole, 4-methyl-5-phenylimidazole, 5-methyl-4-phenylimidazole and 4,5-dimethylimidazole.

Alcohols or ethers of the general formula (III) are also used as starting materials in the stoichiometric amount or in excess of up to eight times with respect to starting material (II). Preferred starting materials (III) and consequently preferred end products (I) are those in whose formulae $R^4$ is alkyl, alkenyl or alkynyl in each case of up to 25 carbon atoms, particularly up to 16 carbon atoms, and $R^5$ is hydrogen or a radical of the preferred meanings for $R^4$. The radicals $R^4$ and/or $R^5$ may be linear or branched. When $R^4$ and $R^5$ are different alkyls, alkenyls or alkynyls in the same starting material, a mixture of imidazoles bearing a substituent on the nitrogen atom is obtained.

The following are examples of alcohols or ethers which may be used as starting materials (III): methanol, ethanol, propanol, butanol, hexanol, octanol, decanol, dodecanol, dimethyl ether and dialkyl ethers corresponding to the said alcohols, methyl ethyl ether, benzyl propyl ether, isobutyl alcohol, secondary butyl ether, diisopropyl ether, crotyl alcohol, allyl alcohol and neopentyl alcohol.

The reaction is carried out in the presence of a catalyst in the form of an oxide and/or phosphate of a metal of Group 2, 3, or 4 of the Periodic Table. Preferred compounds of this type are based on metals of main Groups 2 and 3 of the Periodic Table and Subgroup 4 of the Periodic System, particularly calcium, aluminum, titanium and thorium. The said compounds may be supplied to the reaction alone or mixed in any way with one another. The catalyst is generally used in batchwise operation in an amount of 1 to 50 percent, preferably of 2 to 20 percent, by weight based on starting material (II). In continuous operation from 0.1 to 0.2 part of starting material (II) is used as a rule per hour to 1 part of catalyst. The catalysts may be modified in their structure or surface by physical or chemical treatment, for example by calcination, treatment with steam, soaking with acids, for example phosphoric acid, or salt solutions, for example of nitrates, formates or oxalates of the abovementioned metals. The catalyst may also be applied by impregnation or precipitation onto a carrier material, for example quartz powder, ceramic materials, or pumice, and if necessary converted into its final oxidic form by thermal treatment or decomposition. The carrier materials may contain compounds of other elements, for example sodium, which do not appreciably affect the reaction. The shape given to the particles of catalyst and their size are not of decisive importance for the reaction; catalyst granules of a particle size of from 0.1 to 4 mm are generally used.

Phosphoric acid and/or one or more esters of phosphoric acid are used as additional catalysts, advantageously in an amount of from 0.01 to 0.1 percent by weight based on starting material (II). The phosphoric acid may be esterified once, twice or three times in the esters. The following are examples of suitable compounds: pyrophosphoric acid, metaphosphoric acid and particularly orthophosphoric acid; cycloaliphatic, araliphatic, aromatic and particularly aliphatic esters of phosphoric acid, especially esters having up to twelve carbon atoms such as triethyl, tri-n-butyl, trimethyl, O,O-diethyl-O-phenyl, O-ethyl-O,O-diphenyl, tricyclohexyl, tribenzyl, O,O-dimethyl-O-ethyl, tris-2-ethylhexyl, tris-β-chloroethyl, tris-β-butoxyethyl, tris-β-methoxyethyl, di-(2-ethylhexyl), dioctyl, octadecyl, tricresyl, O,O-diphenyl-O-cresyl, trixylenyl, tris-(p-t-butylphenyl), O,O-diphenyl-O-bisphenyl and O,O-diphenyl-O-methyl esters of phosphoric acid.

In other respects the process is carried out under the conditions of the process of U.S. Pat. No. 3,652,581, particularly as regards starting materials, preparation and composition of the catalysts, conditions and reaction control. The additional catalysts may be united with the metal oxide/metal phosphate catalysts by conventional methods, for example by impregnation, spraying, mixing or common grinding. It is advantageous to add the additional catalyst, prior to the beginning of the reaction, to the starting materials (II) or to the initial mixture of the starting materials and if desired to the carrier gas.

The reaction is carried out at a temperature of from 200° to 450° C, preferably from 300° to 400° C, at atmospheric or superatmospheric pressure, continuously or batchwise.

The reaction may be carried out as follows: a mixture of starting materials (II) and (III) is passed over the catalyst heated to the reaction temperature in a tubular reactor or a fluidized-bed reactor. A gas, for example nitrogen, which is inert under the reaction conditions may be supplied in addition to the said mixture. The end product (I) may be isolated from the reaction mixture, for example by fractional distillation. It is also possible however to take samples from the reaction mixture, to ascertain the ratio of end product (I) to starting material (II) by analysis, for example by gas chromatography, and to further process the reaction mixture without separation of the end product.

The compounds which can be prepared by the process of this invention are intermediates for the production of dyes, textile materials and insecticides.

Regarding the use of substituted imidazoles reference is made to U.S. Pat. Nos. 2,404,299 and 3,531,494. The latter Patent discloses the use of substituted imidazoles as active, synergistic ingredients in insecticidal compositions in admixture with pyrethrins, carbamates and phosphoric acid esters.

The following Examples illustrate the invention. The parts specified are by weight.

EXAMPLE 1

A mixture of 9.6 parts of methanol, 8.2 parts of 2-methylimidazole and 0.001 part of phosphoric acid (84.5 percent by weight strength) is passed per hour by means of nitrogen as the carrier gas at 350° C over a continuously operated fluidized bed (30 parts of $Al_2O_3 \cdot 5\% H_3PO_4$). At intervals a sample is taken of the crude discharge and analyzed gas chromatographically. The conversion (which is 90 to 95 percent) is determined from the ratio of 1,2-dimethylimidazole to 2-methylimidazole.

During operation for 3,000 hours a total of 26,600 parts (92.5 percent of theory) of 1,2-dimethylimidazole is obtained having a boiling point of 105° C at 20 mm.

EXAMPLE 2

A mixture of 9.6 parts of methanol, 14.4 parts of 2-phenylimidazole and 0.001 part of tributyl phosphate is passed per hour with nitrogen as the carrier gas over a continuously operated fluidized bed of catalyst (30 parts of $Al_2O_3 \cdot 5\% H_3PO_4$) at 350° C. In the manner described in Example 1, 34,500 parts (72.8 percent of theory) of 1-methyl-2-phenylimidazole is obtained during operation for 3,000 hours; its boiling point is 130° C at 2 mm.

EXAMPLE 3

A continuously operated fluidized-bed reactor contains 30 parts of $Al_2O_3 \cdot 5\%H_3PO_4$ at 330° C as catalyst over which there is passed hourly a mixture of 6.8 parts of imidazole and 0.001 part of $H_3PO_4$ (84.5 percent by weight) and also, from a reservoir, 13.8 parts of dimethyl ether with nitrogen as carrier gas. In the manner described in Example 1, 22,900 parts (93.2 percent of theory) of 1-methylimidazole is obtained having a boiling point of 76° C at 10 mm in 3,000 hours.

EXAMPLE 4

During each hour a mixture of 11 parts of 2-isopropylimidazole and 0.001 part of tributyl phosphate together with 13.8 parts of dimethyl ether are passed with nitrogen as the carrier gas over a fluidized catalyst (30 parts of $Al_2O_3 \cdot 5\%H_3PO_4$) at 350° C in a continuously operated fluidization reactor. In the manner described in Example 3, 33,200 parts (89.4 percent of theory) of 1-methyl-2-isopropylimidazole is obtained in 3,000 hours; the boiling point is 112° C at 30 mm.

EXAMPLES 5 to 10

Reactions are carried out in accordance with Example 3 with the catalysts set out in the following Table, in which the following abbreviations are used:
Ex = Example No.; PI = parts of imidazole;
PRI = yield of reacted imidazole in parts
%T = yield of reacted imidazole in percent of theory.

Table

| Ex | PI | Catalyst | Phosphoric ester | PRI | %T |
|---|---|---|---|---|---|
| 5 | 68 | $Al_2O_3 \cdot 5\%H_3PO_4$ | triethyl phosphate | 78 | 95 |
| 6 | 68 | $Al_2O_3 \cdot 5\%H_3PO_4$ | trimethyl phosphate | 80 | 98 |
| 7 | 68 | $Al_2O_3 \cdot 10\%H_3PO_4$ | tributyl phosphate | 74 | 90 |
| 8 | 68 | pumice $\cdot 5\%H_3PO_4$ | triethyl phosphate | 68 | 83 |
| 9 | 68 | $TiO_2$ | triisobutyl phosphate | 73 | 89 |
| 10 | 68 | $TiO_2 \cdot 5\%H_3PO_4$ | tributyl phosphate | 69 | 84 |

We claim:

1. In a process for the production of a substituted imidazole of the formula:

$$R^1-C=C-R^2$$
$$\phantom{xxx}| \phantom{xxxx} |$$
$$\phantom{xx}N \phantom{xx} N-R^4$$
$$\phantom{xxxx}\backslash C /$$
$$\phantom{xxxxx} |$$
$$\phantom{xxxxx} R^3$$ (I)

in which $R^1$, $R^2$ and $R^3$ may be identical or different and each respectively denotes hydrogen, alkyl of 1–12 carbon atoms, cyclohexyl, benzyl, or phenyl, and $R^4$ is lower alkyl, by reaction of an imidazole of the formula:

$$R^1-C=C-R^2$$
$$\phantom{xxx}| \phantom{xxxx} |$$
$$\phantom{xx}N \phantom{xx} N-H$$
$$\phantom{xxxx}\backslash C /$$
$$\phantom{xxxxx} |$$
$$\phantom{xxxxx} R^3$$ (II)

in which $R^1$, $R^2$ and $R^3$ have the meanings given above with a compound of the formula:

$$R^4 - O - R^5 \quad (III)$$

in which $R^4$ has the meanings given above and $R^5$ is hydrogen or lower alkyl at a temperature of from 200° to 450° C in the presence of (a) an oxide or phosphate of calcium, aluminum, titanium or thorium as catalyst, the improvement which comprises carrying out said reaction in the presence of as an additional catalyst, at least 0.01 percent by weight, based on said imidazole (II), of (b) a phosphoric acid or an alkyl ester of a phosphoric acid with alkyl groups having up to 12 carbon atoms.

2. A process as claimed in claim 1 wherein the catalyst (b) is added in an amount of 0.01 to 0.1 percent by weight based on said imidazole (II).

3. A process as claimed in claim 1 wherein said reaction is carried out with catalyst (a) present in an amount of 1–50 percent by weight based on said imidazole (II).

4. A process as claimed in claim 1 wherein said compound (III) is used in excess up to eight times with reference to said imidazole (II).

5. A process as claimed in claim 1 wherein the reaction is carried out in a fluidized bed of catalyst (a).

6. A process as claimed in claim 5 wherein the reaction is carried out continuously at a ratio of 0.1 to 0.2 of said imidazole (II) per hour to 1 part of said catalyst (a).

7. A process as claimed in claim 1 carried out at a temperature of from 300° to 400° C.

8. A process as claimed in claim 1 wherein compound (III) is a dialkyl ether having 1–12 carbon alkyl groups.

9. A process as claimed in claim 1 wherein catalyst (b) is ortho phosphoric acid.

10. A process as claimed in claim 1 wherein catalyst (b) is said alkyl phosphoric acid ester.

11. A process as claimed in claim 10 wherein said ester is a trialkyl ester having alkyl groups with up to 12 carbon atoms.

12. A process as claimed in claim 11 wherein $R^4$ denotes hydrogen or methyl and $R^5$ denotes methyl.

13. A process as claimed in claim 1 wherein $R^4$ denotes hydrogen or methyl and $R^5$ denotes methyl.

* * * * *